United States Patent
Kang et al.

(10) Patent No.: US 8,205,167 B2
(45) Date of Patent: Jun. 19, 2012

(54) ANALYZING USER VIEWERSHIP OF ADVERTISEMENTS APPEARING IN A SCREEN DISPLAY IN A USER TERMINAL

(75) Inventors: Sang Chul Kang, Seoul (KR); Chang Woo Min, Seoul (KR)

(73) Assignee: International Business Machines Corporation, Armonk, NY (US)

( * ) Notice: Subject to any disclaimer, the term of this patent is extended or adjusted under 35 U.S.C. 154(b) by 2973 days.

(21) Appl. No.: 10/263,217

(22) Filed: Oct. 2, 2002

(65) Prior Publication Data

US 2003/0079176 A1   Apr. 24, 2003

(30) Foreign Application Priority Data

Oct. 19, 2001   (KR) .................. 10-2001-0064641

(51) Int. Cl.
*G06F 3/048*   (2006.01)
(52) U.S. Cl. ............ 715/781; 705/14.4; 705/14.49; 705/14.52; 705/14.73; 709/227; 709/229; 709/217; 709/219
(58) Field of Classification Search ............ 715/781; 705/14.4, 14.52, 14.73, 14.49; 709/229, 709/217, 219
See application file for complete search history.

(56) References Cited

U.S. PATENT DOCUMENTS

| | | | |
|---|---|---|---|
| 5,740,549 A | 4/1998 | Reilly et al. | |
| 5,937,392 A * | 8/1999 | Alberts | 705/14 |
| 6,285,985 B1 * | 9/2001 | Horstmann | 705/14 |
| 7,016,898 B1 * | 3/2006 | Forlenza et al. | 707/10 |
| 2001/0037314 A1 * | 11/2001 | Ishikawa | 705/67 |
| 2001/0054001 A1 * | 12/2001 | Robinson | 705/14 |
| 2002/0013785 A1 * | 1/2002 | Miyazaki et al. | 707/104.1 |
| 2002/0016736 A1 * | 2/2002 | Cannon et al. | 705/14 |
| 2002/0052925 A1 * | 5/2002 | Kim et al. | 709/217 |
| 2002/0069261 A1 * | 6/2002 | Bellare et al. | 709/218 |

FOREIGN PATENT DOCUMENTS
KR   1020010086645   9/2001
* cited by examiner

*Primary Examiner* — Tadeese Hailu
*Assistant Examiner* — Patrick Riegler

(57) ABSTRACT

A method and system for providing an advertisement window in a certain area of a web browser executed in a user terminal, wherein the user terminal being communicated with at least one advertiser server and an advertisement control server over the Internet. The method includes the steps of requesting a user identification code; receiving the user identification code from the advertisement control server, and storing the code on the local storage of the user terminal; requesting advertisement control data to the advertisement control server using the stored user identification; receiving the advertisement control data from the advertisement control server, and displaying control information of the advertisement window; accessing and obtaining the advertisement data located on the received address; and placing, in a certain area of the web browser.

3 Claims, 8 Drawing Sheets

FIG. 3 user info. DB 160

| user code | name | resident registration No. | address | ... |
|---|---|---|---|---|
| | | | | |

AD control info. DB 170

| advertiser code | AD No. | URL | AD location | AD size | refresh period | ... |
|---|---|---|---|---|---|---|
| 000001 | 1 | http://A.com/1.html | | | | |
| 000002 | 2 | http://A.com/2.html | | | | | use history DB 180

| advertiser code | Start time | End time | AD window No. | ... |
|---|---|---|---|---|
| | | | | |

FIG. 6

```
<HTML>
<HEAD>
<TITLE></TITLE>
</HEAD>
<BODY leftMargin=0 topMargin=0 bottomMargin=0 bgcolor=Gold>
<CENTER>
<TABLE border=0 style="WIDTH: 700px; HEIGHT: 60px"
cellspacing=0 cellpadding=0 bgcolor=Orange>
 <TR>
  <TD>
  <IFRAME SRC="a secondary advertiser's URL"  syle="WIDTH: 194px;
  HEIGHT: 60px" border=0 frameBorder=0 scrolling=no
  >
  </IFRAME>
  </TD>
  <TD>
    <IFRAME SRC="a primary advertiser's URL" style="WIDTH: 470px;
    HEIGHT: 60px" border=0 frameBorder=0 scrolling=no
    id=IFRAME1
  >
  </IFRAME>
  </TD>
 </TR>
</TABLE>
</CENTER>
<P></P>
</BODY>
</HTML>
```

ANALYZING USER VIEWERSHIP OF ADVERTISEMENTS APPEARING IN A SCREEN DISPLAY IN A USER TERMINAL

BACKGROUND OF THE INVENTION

The present invention relates to an advertisement system and method for providing an advertisement window in a web browser and/or a file explorer, more particularly, to an advertisement system and method for providing an advertisement window for continuously displaying an advertisement in a certain area of a web browser and/or a file explorer.

Recently, as a personal computer is popularized and Internet is widely used, more and more companies have started to advertise their products/services through the Internet. A most popular advertisement method through the Internet is to display a "banner" advertisement in a web page. A banner is a graphic image that announces the name or identity of a web site and often includes the link information to the associated web page. According to such method, when a user visits a certain web page to see or search for some information, the user sees the banner. This method has been used by most portal sites and retrieval sites as a main incoming resource.

The banner advertisement can be represented using various types of medium, for example, a sound and a dynamic picture image. By using such medium, the advertisement can be spectacularly made in the visual viewpoint to catch the user's eye, and then the intention of the advertisement is transmitted to the user. Also, in case where the advertisement is clicked, the user can visit the associated web site.

However, since the banner advertisement is inserted in a specific web page, when the user moves to another web page, the banner advertisement disappears. Accordingly, there is a problem that the user can see the advertisement only when the user visits the page having the banner advertisement. Also, most portal sites have a limited number of pages in which the banner advertisement can be inserted.

There is another advertising method that uses a pop-up advertisement window. However, this method does not solve the above-mentioned problems, either, since the user can see the advertisement only when the user visits the page having the pop-up advertisement window.

Therefore, there is a need for an advertising method and system that can continuously display an advertisement regardless of a web page where a user visits.

SUMMARY OF THE INVENTION

According to one aspect of the present invention, a method for providing an advertisement window in a certain area of a web browser executed in a user terminal, wherein the user terminal being communicated with at least one advertiser server and an advertisement control server over the Internet is provided. The method includes the steps of requesting a user identification code to the advertisement control server when the user identification code is not found in the user terminal; receiving said user identification code from the advertisement control server, said user identification code being generated by the advertisement control server and including an advertiser code associated with the user terminal and a user serial code associated with the advertiser code, and storing the code on the local storage of the user terminal; requesting advertisement control data to the advertisement control server by using the stored user identification; receiving said advertisement control data from the advertisement control server, said advertisement control data including an address of advertisement data stored in the advertiser server associated with the advertiser code within the user identification code and display control information of the advertisement window; accessing and obtaining the advertisement data located on the received address; and placing, in a certain area of the web browser, the advertisement window in which the advertisement data is displayed according to the display control information.

BRIEF DESCRIPTION OF THE DRAWINGS

The invention will be more particularly described with reference to the accompanying drawings, in which:

FIG. 3 illustrates an example of the table structure of a user information database 160, a use history information database 170, an advertisement control information database 180, which are used in the advertisement control server 150 according to the embodiment of the present invention;

FIG. 6 shows the advertisement control program created in the advertisement control server according to the embodiment of the present invention.

DETAILED DESCRIPTION OF THE PREFERRED EMBODIMENT

Hereinafter, features and advantages of the present invention will be explained with reference to FIGS. 1 to 8. The embodiment shown in FIGS. 1 to 8 is provided in order to explain the present invention and it may be variously changed. Accordingly, it should be understood that the present invention is not limited to the specific embodiments thereof presented herein.

Figure 1:
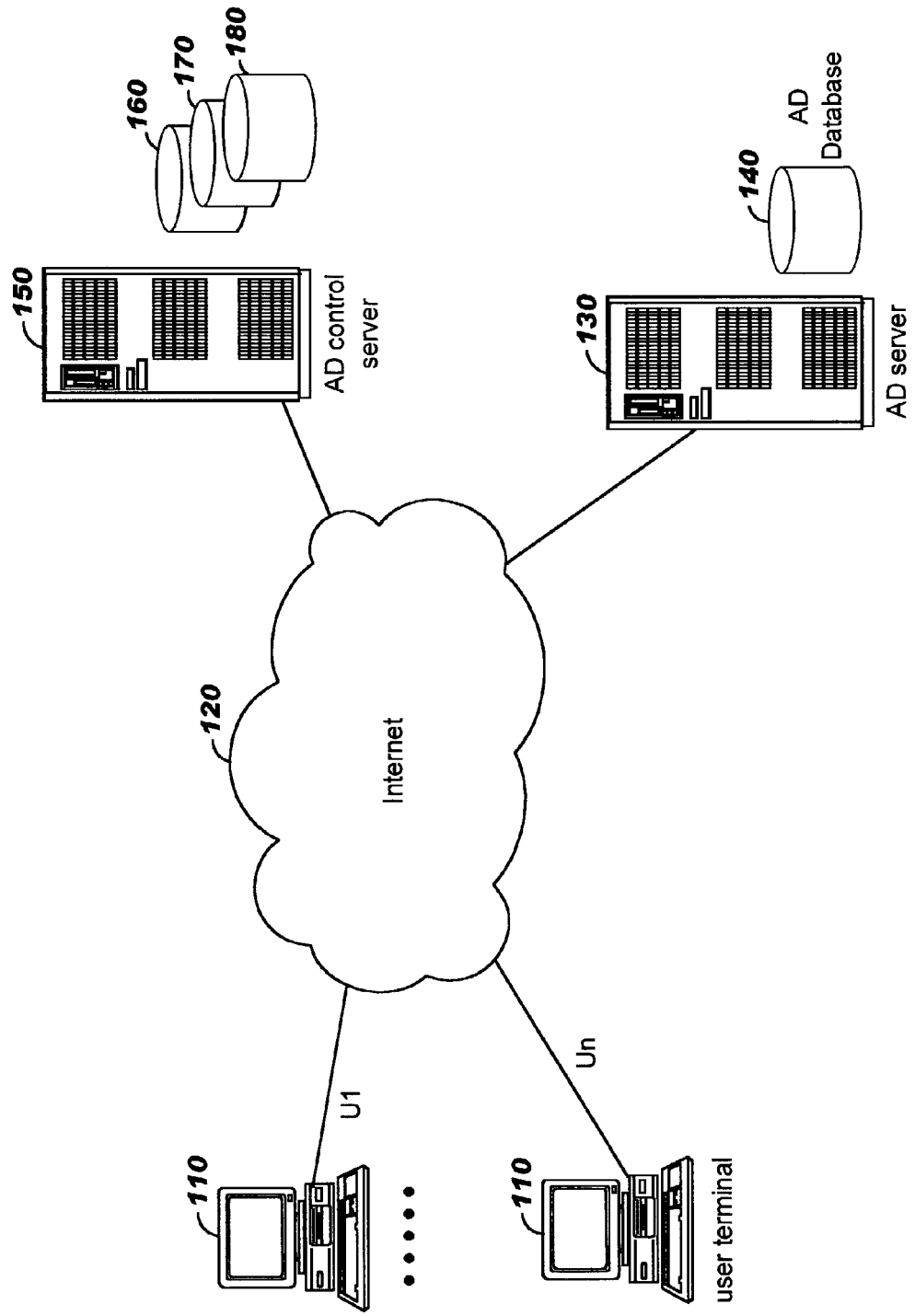
FIG. 1 shows a schematic diagram of a system according to an embodiment of the present invention.

Referring to FIG. 1, a schematic diagram of a system configuration according to the embodiment of the present invention is shown. As shown in FIG. 1, a plurality of user terminals 110, an advertisement server 130 managed by an advertiser, an advertisement control server 150 managed by an advertising agency are connected over the Internet 120. For the convenience of explanation, only one advertisement server 130 is shown in FIG. 1, but a plurality of advertisement servers managed by different advertisers may be connected.

Generally, all types of the data processing system such as a personal computer, a workstation, a notebook computer, a PDA, a mobile telephone (cellular phone), which can communicate information through the Internet 120 and process it, may be used as a user terminal 110. At the user terminal 110, an operating system program (for example, Windows 95, Windows 98, Windows CE, which are manufactured by MicroSoft Corporation) and a web browser (for example, Internet Explorer, which are also manufactured by MicroSoft Corporation) may be executed. Besides to such programs, the user terminal 110 will execute an advertisement display program (not shown) embodied according to the present invention.

The advertisement display program is a kind of plug-in application program that may be provided to users by an advertising agency or an advertiser through the Internet or off-line. A "plug-in application" is a program that can easily be installed and used as part of a web browser and/or a Windows file explorer at the user terminal 110.

The advertisement display program may not only provide a user with available functions such as translation, but also provide an advertisement window in a certain area of the web browser and/or the file explorer.

The advertisement server 130 is a web server managed by an advertiser and can provide a user with an advertisement display program via his/her web site. In addition, advertisement content data are stored in an advertisement database 140. The content data may be in various types of files such as a HTML file, a GIF file, and a MPEG file. The advertisement server 130 may provide advertisement content data when the advertisement display program 112 executed in the user terminal requests them by sending an advertisement URL address.

The advertisement control server 150 is the web server that is operated by an advertising agency. It may provide users with an advertisement display program over their web site and also provide advertisement control data (or advertisement control program) so that the user can see the related advertiser's advertisement through an advertisement window provided by the advertisement display program executed at the user terminal. The advertisement control server 150 includes a user information database 160 for storing information about users who use the advertisement display programs; an advertisement control database 170 for storing advertisement control data on advertisements with respect to each advertiser; and a use history statistics information database 180 for storing use history information of users in order to calculate the statistics of the number of the users with respect to each advertiser.

Figure 2:
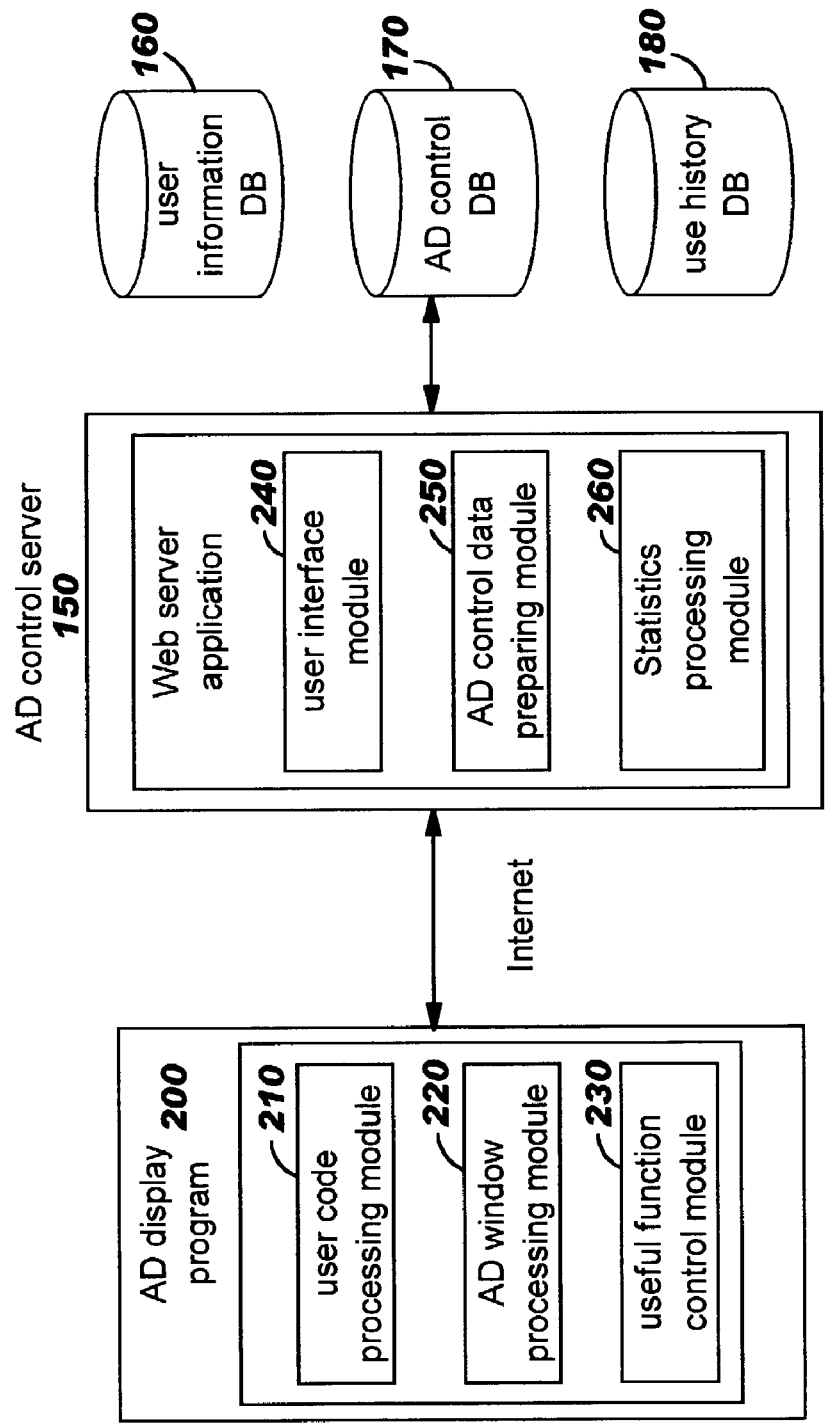
FIG. 2 is a configuration diagram of an advertisement display program executed in a user terminal and an advertisement control server according to the embodiment of the present invention.

Referring to FIG. 2, a configuration diagram of an advertisement display program, which is executed in a user terminal, and an advertisement control server 150 according to the embodiment of the present invention is shown.

After the advertisement display program is installed at the user terminal 110, an advertisement window for displaying the advertisement in a certain area of the Web browser and/or the file explorer will be displayed. This advertisement window can be changed into a pop-up window or a window which can be displayed in an entire screen, in accordance with the property of the advertisement. The advertisement window according to the present invention is characterized in that the user can not close the window while the web browser is running.

Also, the advertisement display program may provide users with additional useful functions (for example, translation, search, English/Korean Text-to-Speech, HTML editing, and etc.). Accordingly, users can utilize these useful functions at the cost of watching the advertisement displayed in the advertisement window.

Figure 5:
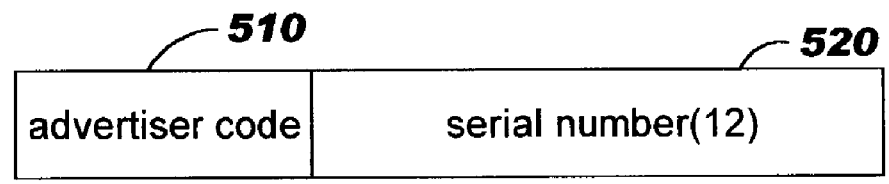
FIG. 5 shows an example of a user code format used in the embodiment of the present invention.

The advertisement display program 200 includes a user code processing module 210 and an advertisement window processing module 220. The advertisement display program may also include a useful function control module 230 for providing a user with useful functions. The user code processing module 210 requests a user code from the advertisement control server 150 over the Internet when the user installs the advertisement display program at his/her own terminal and then executes it for the first time. The advertisement display program 200 includes an advertiser code associated with an advertisement to be displayed in the advertisement window. It requests a user code by sending the advertiser code. The "user code" is the code combining the advertiser code received from the advertisement display program and a user serial number created with respect to the received advertiser code, as shown in FIG. 5. After the user code processing module 210 receives the user code from the advertisement control server 150 over the Internet, it stores the user code in the local storage of the user terminal. The user code will be used as an identifier of the user terminal in the future communication with the advertisement control server 150.

The advertisement window processing module 220 displays the advertisement window for displaying the advertisement in a certain area (the left, right, top or bottom) of the Web browser and/or the file explorer. The advertisement window processing module 220 requests advertisement control data by transmitting the user code to the advertisement control server 150 and then displays the advertisement according to the advertisement control data received from the advertisement control server 150 in response to the request. The advertisement control data may include an advertisement URL address in which the advertisement HTML data of the advertiser are stored, the location and the size of the advertisement window, and an advertisement display period. The advertisement window processing module 220 stores the advertisement control data in the local storage, accesses the advertisement server at the URL address included in the control data, fetches the corresponding advertisement data from the advertisement server, and then displays the advertisement in the advertisement window according to the location and size specified in the control data.

In an alternative embodiment, the advertisement window processing module 220 can send the advertisement control server an advertisement window number of the web browser and/or the file explorer executed at the user terminal, together with the user code, when requesting the advertisement control data to the advertisement control server. The "advertisement window number" refers to the number assigned to each of the advertisement windows to differentiate them, whenever the user newly executes the web browser or the file explorer, creating a new advertisement window. Since the user can execute a plurality of the web browsers or the file explorers at the same time, the different advertisements of the same advertiser can be displayed in the respective windows, to improve the advertising effect. Once the advertisement window is created in a certain area of the web browser by the advertisement window processing module 220, it will be always displayed until the user stops executing the web browser. Accordingly, the advertisement can be lastingly displayed in the advertisement window, and, because the user can not close the advertisement window at his/her own will, a high advertisement effect can be accomplished. Also, in a case where the user terminal is not connected to the Internet, the advertisement window processing module 220 can display any advertisement previously stored in the local storage of the user terminal.

In another alternative embodiment, the advertisement window processing module 220 can provide an additional window for providing a user with useful functions such as text translation, as well as various types of information (such as news/stock/hobby) in accordance with the preference of the user. This function-implemented HTML data may be provided by the advertisement control server over the Internet.

The useful function control section 230 may display several icons corresponding to available functions, such as the Internet dictionary, web site/mp3/image search function, the translating function, the homepage reading function (English/Korean TTS), and the HTML editing function, in the tool bar location of the web browser and/or the file explorer, and control them such that the functions can be executed according to the selection of the user. These functions may be provided to the user as the cost of watching the advertisement of the advertiser over the advertisement. It should be understood by those skilled in the art that there are already a number of conventional application programs that implement these functions and they can be readily incorporated into the advertisement display program of the present invention, in order to attract more users.

The web server application programs executed by the advertisement control server 150 can be implemented by, for example, CGI, JAVA Servlet, JSP, or ASP, and may include a user interface module 240, and an advertisement control data preparing module 250 and a statistics processing module 260.

The user interface module 240 receives a request of a user code, together with an advertiser code, from the advertisement display program 200 of the user terminal, generates the user code by combining the advertiser code and a user serial number, and sends it to the user terminal. The user serial number can be generated with respect to each advertiser, by increasing by one whenever a new user requests a user code. The user code generated by the user interface module 240 is then stored in the user information database 160.

In addition, when the user downloads the advertisement display program from a web site operated by an advertisement control server or advertiser server, basic user information, for example, a ID, a password, a name, a resident registration number, an address, an e-mail an so on can be entered and then stored in the user database 170. Such user information can be used in a gift event for maximizing the distribution effect of the advertisement display program.

Referring to FIG. 3, an example of the table structure of the user information database 160 is shown. As shown, the table of the user information database 160 may include personal information such as a user code, a resident registration number, and an address. The table structure is not limited to the above-mentioned structure and it should be understood that the other information can be stored in the user database.

In response to the request of advertisement control data from the advertisement display program 200, the advertisement control data preparing module 250 generates advertisement control data including a URL address of an advertisement to be displayed in the advertisement window and send them to the user terminal. When the advertisement display program requests the advertisement control data by sending the user code only or the user code and the advertisement window number, the advertisement control data preparing module 260 retrieves advertisement control information corresponding to the advertiser code included in the received user code and the advertisement window number, from the advertisement control information database 170.

Referring to FIG. 3, an example of the table structure of the advertisement control information database 170 is shown. As shown, the advertisement control information database includes an advertiser code, an advertisement number (in case that there are a plurality of advertisements with respect to the same advertiser), an advertisement URL, information on the location and size of the advertisement and a refresh period. Besides such information, other information required for controlling the advertisement may be included, and it should be understood that the addition or the change of the advertisement control information is not departed from the spirit and the scope of the present invention.

The advertisement URL indicates the address where actual advertisement content data are stored. The actual advertisement content data may be in HTML file format or a kind of the program, such as the CGI program that can generate advertisement content or JAVA servlet that can be run to generate the content in the web server. The advertisement URL information of the advertisers and other advertisement control information may have been already stored in the advertisement control information database 170. In another embodiment, the advertisement control server may request such information to the corresponding advertiser server, whenever it is needed.

The advertisement control data preparing module 250 generates the HTML type advertisement control data on the basis of the advertisement control information retrieved from the advertisement control information database 170 and sends it to the advertisement display program. If the advertisement window number, together with the user code, is transmitted from the user terminal, the advertisement control data preparing module 260 should first decide which advertisement will be displayed in the advertisement window having the received advertisement window number, among a plurality of the advertisements of the same advertiser, and then generate the corresponding advertisement control data to be sent to the user terminal.

For example, assume that the user executes two web browsers or the file explorers at the same time in the user terminal and three advertisements, AD #0, AD #1 and AD #2, with respect to a certain advertiser, have been prepared. Provided that the advertisement window number "1" is received from the user terminal, the number of the advertisement to be displayed in the first window would be 1%3=1 and therefore the advertisement control data associated with AD #1 would be generated and sent to the user terminal. Next, provided that the advertisement window number "2" is received, the number of the advertisement to be displayed would be 2%3=2 and therefore the advertisement control data associated with AD #2 would be generated and sent to the user terminal. In this manner, different advertisements of the same advertiser can be displayed in each of the advertisement windows, respectively.

In an alternative embodiment, the advertisement control data preparing module can generate the advertisement control data so that the advertisement display program can simultaneously display at least two advertisement windows, for example, by dividing one advertisement window into primary and secondary advertisement sections. In this case, at least two advertisements which are different from each other can be simultaneously provided to the user.

The advertisement method according to the embodiment of the present invention is characterized in that the advertisement control server does not directly provide actual advertisement content data, but provides only the URL address of the advertisement and display control information, to the user terminal. Since actual advertisement content data are stored in the advertisement server managed by the advertiser, the advertiser can freely and easily change or modify his/her advertisement contents at the same URL so that the advertisement effect can be maximized The statistics processing module 250 can calculate various kinds of statistics that may be provided to the advertiser based on the information stored in the user information database 160 as well as the use history information database 180 as shown in FIG. 3. For example, the statistics processing module 250 can know the number of users who have installed the advertisement display program, by tracking the recently generated user code, with respect to each advertiser, which is the combination of a user serial number and an advertiser code. Furthermore, based on personal information of users stored in the user information database 160, the statistics processing module 250 can calculate various statistic values which may be useful for advertisers' marketing, such as age and the sex statistic values of users watching advertisements.

Referring again to FIG. 3, an example of the table of the use history information database 180 according to the present invention is shown. As shown, the table of the use history information database 180 includes a user code, start and end times of the advertisement display program, an advertisement number and so on. In addition, available other information may be included in the use history information database 180, if necessary. The "start time" is the time at which the user requests advertisement control data, and the "end time" is the time at which the execution of the advertisement display program is finished at the user terminal. The user terminal may automatically send the start time information when it requests advertisement control data to the advertisement control server and also send the end-time information of the advertisement display program to the advertisement control server, when the program execution is stopped by the user.

Based on such time information stored in the user history information database 80, the statistics processing module 250 can calculate the number of times that each user requests advertisements and watching time in which each user watches advertisements.

Figure 4:
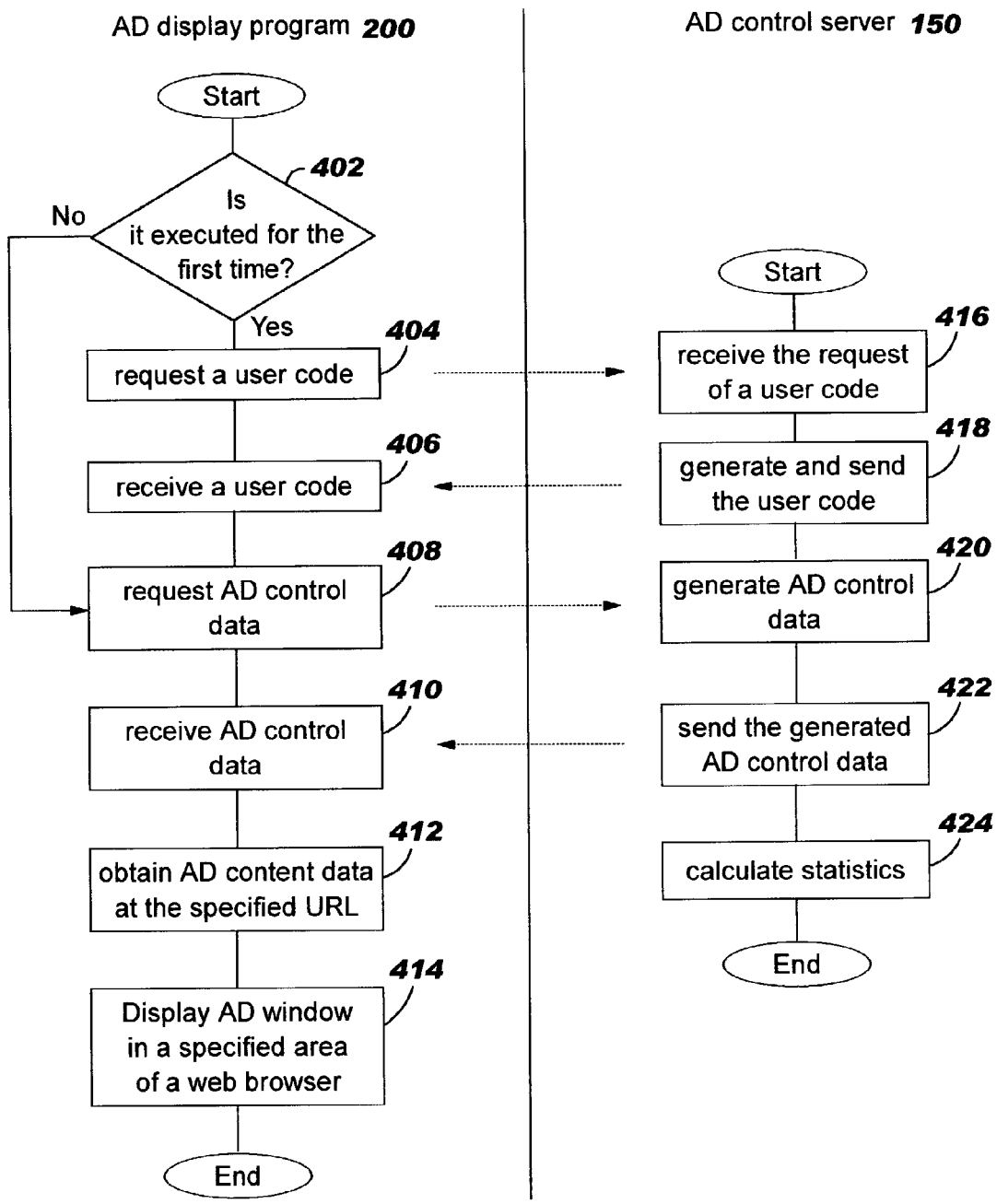
FIG. 4 is a flowchart illustrating an interaction between the advertisement display program and the advertisement control server according to the present invention.

Referring to FIG. 4, a flowchart illustrating the interaction between the advertisement display program and the advertisement control server according to the embodiment of the present invention is shown.

At step 402, when the web browser (or the file explorer) is executed at the user terminal, the advertisement display program which has been plugged in the web browser checks whether it is firstly executed after its installation. If so, the advertisement display program requests a user code to the advertisement control server by sending the advertiser code associated with the advertisement display program to the advertisement control server (step 404).

When the advertisement control server receives the request of the user code from the advertisement display program (step 416), it generates the user code by combining the received advertiser code and a user serial number generated with respect the received advertiser code and then sends it to the advertisement display program (step 418). At this time, the generated user code is stored in the user information database 160.

The advertisement display program receives the user code from the advertisement control server (step 406) and stores it in the local storage, thereby the user code is used as the identification number of the user terminal in the next communication with the advertisement control server.

In the step 408, the advertisement display program sends the user code and the advertisement window number to the advertisement control server so as to request advertisement control data. In response to the request of the advertisement control data, the advertisement control server retrieves the advertisement control information associated with the corresponding advertiser from the advertisement control information database 170 to generate the advertisement control data (step 420). The advertisement control data are sent to the user terminal (step 422).

In the step 410, the advertisement display program receives the advertisement control data from the advertisement control server and analyzes the advertisement URL information and the advertisement display information.

In the step 412, the advertisement display program accesses the advertisement server of the advertiser based on the advertisement URL information contained in the advertisement control data and fetches the advertisement content data at the corresponding location.

In the step 414, the advertisement content data fetched from the advertisement server are displayed in the advertisement window located in a certain area of the web browser or the file explorer in accordance with the advertisement display information contained in the advertisement control data. Accordingly, the user can watch the advertisement displayed in the advertisement window during the execution of the web browser or the Window explorer.

At step 424, the advertisement control server may evaluate the number of the advertisement display programs installed at the user terminals, the connection number of times and the connecting time, based on the information stored in the user information database 160 and the use history information database 170, with respect to each advertiser.

FIG. 5 shows an example of the user code format according to the embodiment of the present invention. As shown in FIG. 5, the user code is composed of an advertiser code (for example, a six-digit number) and a serial number (for example, a twelve-digit number). The advertiser code 510 is the code for identifying advertisers that have made a license agreement with the advertising agency for using and/or distributing the advertisement display program according to the present invention. The advertiser code 510 is incorporated into the advertisement display program in order to identify which advertiser is associated with the program. Although the above-mentioned embodiment uses the six-digit number as an advertiser code, it is not limited to it.

The serial number 520 with respect to each advertiser is generated by increasing by "1," whenever a user code is requested by a new user terminal installing and executing the advertisement display program for the first time.

As mentioned above, the user code composed of the advertiser code and the serial number is used as an identification code for identifying the advertisement display program of the user terminal which requests advertisement control data to the advertisement control server.

FIG. 6 shows an example of the advertisement control data generated by the advertisement control server according to one embodiment of the present invention. As it is shown in FIG. 6, the advertisement control data may be generated in HTML format. Using the advertisement control data, the advertisement display program can display advertisement data provided by an advertiser within the advertisement window located in a specified area of the web browser/file explorer. The advertisement window of the advertisement display program may be divided into a plurality of the portions by using "FRAME" or "IFRAME", which are a kind of HTML tags. The advertisement display program controls the location and the size of the advertisement window to be displayed, based on the HTML advertisement control data and fetches the advertisement data at the URL included in the advertisement control data from the advertisement server, by using a HTTP protocol, and displays them in the advertisement window. According to the example shown in FIG. 5, the advertisement window will be divided into two separated advertisement areas, that is, main-advertisement area of "a primary advertiser" and sub-advertisement area of "a secondary advertiser."

Figure 7:
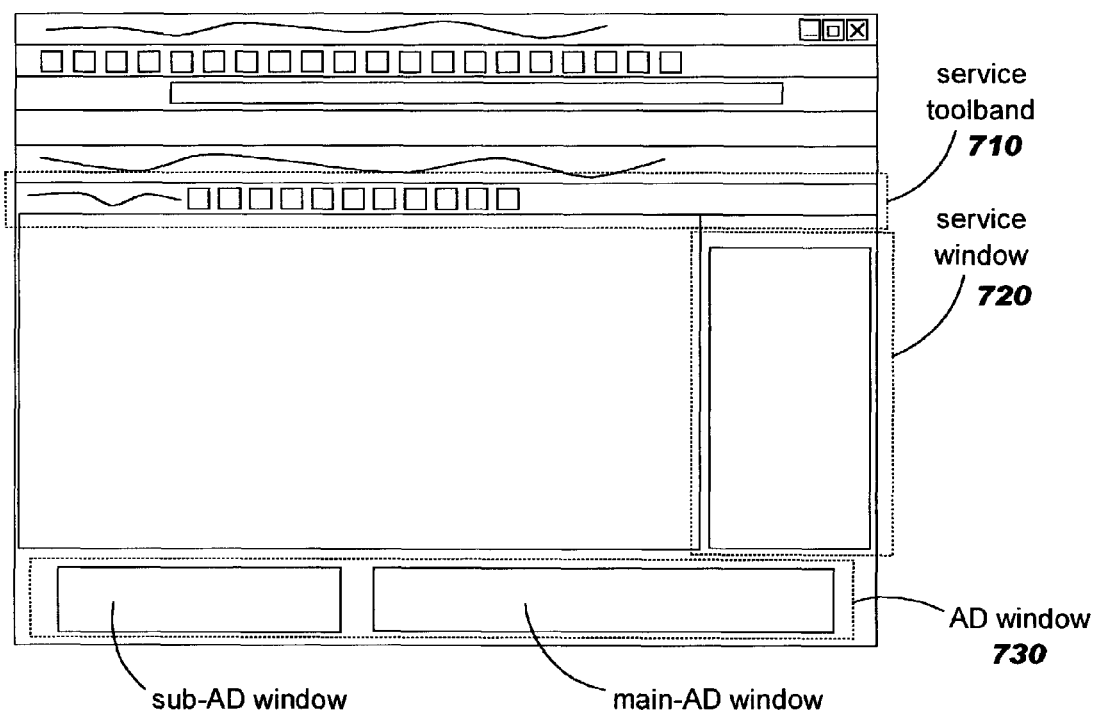
FIG. 7 shows an exemplary screen shot of a web browser in which an advertisement window is located according to the embodiment of the present invention.

FIG. 7 shows an exemplary screen shot of a web browser in which an advertisement window is located according to the embodiment of the present invention; and A service tool band 710 placed below the basic tool bar of the web browser is composed of icons representing available functions. The service tool band 710 may be composed of, for example, basic function icons of "TRANSMATE," which is an English-Korean translation program product manufactured by IBM Corporation.

A service window 720, which can be additionally provided together with the service tool band 710, can display various kinds of useful information provided by the advertisement control server. For example, if the user can choose some categories of information that he/she is interested in, then the advertiser control server gathers the information related to the user's interest from other web sites and provides it, together with the advertisement control data, to the user, in order for the information to be displayed in the service window 720.

FIG. 7 shows the advertisement window that is divided into two advertisement sections, i.e., main window and sub window to display different advertisements at the same time. Although the advertisement window is located in the bottom portion of the web browser in FIG. 7, the location of the advertisement window and can be determined in accordance with the advertisement control data. The advertisement window according the present invention is characterized in that it is continuously displayed in a specific area of the web browser, as long as the web browser is executed at the user terminal, and the user can not close the advertisement window at his/her own will.

Figure 8:
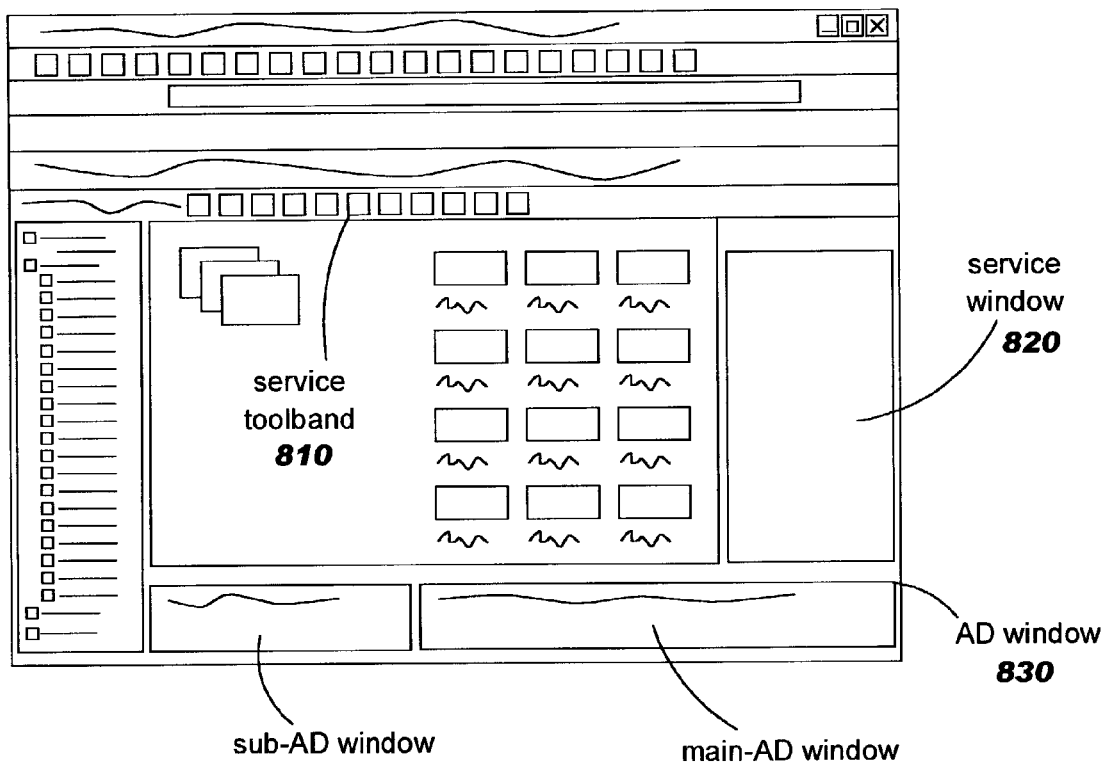
FIG. 8 shows an exemplary screen shot of a file explorer in which an advertisement window is located according to the embodiment of the present invention.

FIG. 8 shows an exemplary screen shot of a file explorer in which an advertisement window is located according to the present invention. Since the windows shown in FIG. 8 substantially correspond to the windows in FIG. 7, the detailed explanation thereof will be omitted.

In a user's aspect, according to the present invention, users can freely use useful functions, such as translation, search, text-to-speech conversion and information providing service, at the cost of watching advertisements of a certain advertiser through the advertisement window generated by the advertisement display program, which has been provided from the advertiser/advertising agency and incorporated into the web browser and/or the file explorer.

In an advertiser's aspect, according to the present invention, once the advertisement display program provided by the advertiser/advertising agency has been incorporated into the web browser and/or the file explorer executed at the user terminal, the advertisement(s) will be continuously presented to a user through the advertisement display window(s) located in the specified area of the web browser and/or the file explorer during the execution. Therefore, the advertising effect can be significantly increased. In another embodiment, the advertisement control data from the advertisement control server and the related advertisement content data from the advertiser server can be varied on a time basis so that different kinds of advertisements may be presented to users in different time.

Also, based on the information stored in the user information database and the use history database, an advertiser can perform target marketing.

The above-mentioned detailed description of the present invention is provided for the sake of an illustration and the explanation of the present invention, and the present invention is not limited to the above-mentioned embodiments. Accordingly, it should be understood by those skilled in the art that the foregoing and various other changes, omission and additions may be made therein and thereto, without departing from the spirit and scope of the present invention.

What is claimed is:

1. An advertising control server for controlling an advertisement window to be displayed in a screen display produced by a user program being executed in a user terminal, said server comprising:

means for receiving a request from the user terminal to send a user identification code, said request including an advertiser code associated with the user terminal;

means for generating and sending the requested user identification code to the user terminal, the user identification code including the advertiser code received from the user terminal and a user serial code associated with the advertiser code;

first storage means for storing the generated user identification code;

second storage means for storing advertisement control information, said advertisement control information being associated with said advertiser code and including an URL address of advertisement data stored in an advertiser server and the related display control information for the advertisement;

means for receiving a request from the user terminal to send advertisement control data, said request including the user identification code;

means for retrieving, from the second storage means, the advertisement control information associated with the advertiser code included in the user identification code, for generating advertisement control data based on the retrieved advertisement control information, and for sending the generated advertisement control data to the user terminal;

third storage means for storing information on request time when the user terminal requests the advertisement control data and end time when the user terminal is disconnected; and means for calculating a number of users for every advertiser, based on user identification codes stored in the first storage means, and calculating statistics for a period of time during which user watches the advertisement window, based on the time information stored in the third storage means.

2. A method performed in an advertisement control server for controlling an advertisement window to be displayed in a screen display produced by a user program being executed in a user terminal comprising:

receiving a request from the user terminal to send a user identification code, said request including an advertiser code associated with the user terminal;

generating and sending the requested user identification code to the user terminal, the user identification code including the advertiser code received from the user terminal and a user serial code associated with the advertiser code;

storing the generated user identification code;

storing advertisement control information, said advertisement control information being associated with said advertiser code and including an address of advertisement data stored in an advertiser server and the related display control information for the advertisement;

receiving a request from the user terminal to send advertisement control data, said request including said user identification code;

retrieving the stored advertisement control information associated with the advertiser code included in the user identification code;

generating advertisement control data based on the retrieved advertisement control information;

sending the generated advertisement control data to the user terminal;

storing user time information including information of request time when the user terminal requests the advertisement control data and end time when the user terminal is disconnected; and calculating a number of users for every advertiser, based on the stored user identification code, and calculating statistics for a period of time during which every user watches the advertisement window, based on the stored user time information.

3. A computer program product executed in an advertisement control server for controlling an advertisement window to be displayed in a screen display produced by a user program being executed in a user terminal, said computer program product comprising a computer usable medium having computer usable program code embodied therewith, said computer usable program code comprising:

computer usable program code configured to receive a request from the user terminal to send a user identification code, said request including an advertiser code associated with the user terminal;

computer usable program code configured to generate and send the requested user identification code to the user terminal, the user identification code including the advertiser code received from the user terminal and a user serial code associated with the advertiser code;

computer usable program code configured to store the generated user identification code;

computer usable program code configured to store advertisement control information, said advertisement control information being associated with said advertiser code and including an address of advertisement data stored in an advertiser server and the related display control information for the advertisement;

computer usable program code configured to receive a request from the user terminal to send advertisement control data, said request including said user identification code;

computer usable program code configured to retrieve the stored advertisement control information associated with the advertiser code included in the user identification code;

computer usable program code configured to generate advertisement control data based on the retrieved advertisement control information;

computer usable program code configured to send the generated advertisement control data to the user terminals;

computer usable program code configured to store user time information including information of request time when the user terminal requests the advertisement control data and end time when the user terminal is disconnected; and computer usable program code configured to calculate a number of users for every advertiser, based on the stored user identification code, and calculating statistics for a period of time during which every user watches the advertisement window, based on the stored user time information.

* * * * *